3,153,669
PROCESS FOR PREPARING TETRAHALO-
MUCONIC ACIDS
Alexander T. Shulgin, Lafayette, Calif., assignor to The
Dow Chemical Company, Midland, Mich., a corporation of Delaware
No Drawing. Filed June 5, 1961, Ser. No. 114,634
4 Claims. (Cl. 260—537)

The present invention relates to a process for the oxidation of perhalo-o-quinones, and more particularly concerns a novel process for the preparation of tetrahalomuconic acids having the following formula

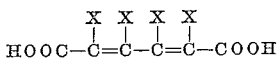

wherein each X is an independently selected halogen having an atomic number from 17 to 35.

The tetrahalomuconic acids of the present invention are useful as herbicides and as intermediates in the preparation of other organic compounds such as aliphatic haloacids and lactones.

The known methods for the preparation of tetrahalomuconic acids are commercially unsatisfactory because they employ starting materials which are generally expensive and not readily available. In addition, the yields resulting from the known methods are low and the time required is inordinately long. Further, it is difficult to obtain the products in substantially pure form.

It is one of the principal objects of the present invention to provide a method for the preparation of tetrahalomuconic acids from readily available starting reactants. Another object is to provide an improved method for the production of tetrahalomuconic acids in substantially pure form and in high yield. Other objects will become apparent from the following specification and claims.

It has now been found that by reacting a perhalo-o-quinone with a lower aliphatic peracid and with a strong acid selected from the group consisting of sulfuric acid, trifluoroacetic acid, trichloroacetic acid, and pyrophosphoric acid in a reaction medium that is a solvent for the reactant perhalo-o-quinone and that is not a solvent for the product tetrahalomuconic acid there is obtained a high yield of a relatively easily purified tetrahalomuconic acid.

In carrying out the invention, a perhalo-o-quinone of the formula

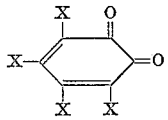

where each X is independently selected from the group consisting of chlorine and bromine, is dissolved in the reaction medium which is in sufficient volume to provide a solution of about 15% by weight, although this proportion is not critical and proportions between about 5 and about 30% or between the solubility limits of the perhalo-o-quinone in the selected solvent, may be used. Normally, the perhalo-o-quinones are not soluble in chlorinated hydrocarbons to an extent greater than about 20%. To the so-formed solution there is then added the peroxy compound derived from a lower aliphatic acid and the strong acid. The order of addition of the reagents is not critical and any convenient mode of operation may be used. It is apparent that though the process is illustrated herein with reference to a batch process, continuous processes in which the reactants are fed to a reactor and a product stream withdrawn continuously, are operable. Since the reactants form two phases, vigorous agitation is necessary to insure substantially complete reaction. Thus, the reactor used in a continuous process must be supplied with continuous agitation while in a batch process the agitation may be provided after the reactants are combined.

The perhalo-o-quinone may be prepared according to the method disclosed and claimed by Albert L. Rocklin in U.S. Patent No. 2,920,082.

The selection of the solvent reaction medium is important to the success of the instant process. It has been found that the product tetrahalomuconic acids are grossly susceptible to degradation when in solution under the reaction conditions. Thus, in order to prevent loss of the desired product, it is necessary to provide a reaction medium in which the product is not soluble so that, as it is formed, it precipitates from the medium and may be recovered without loss. It has been found that the lower aliphatic chlorinated hydrocarbons are suitable for use in the indicated manner. Thus, carbon tetrachloride, methylene chloride, perchloroethylene, chloroform, tetrachloroethane and others may be used. Because of convenient availability, methylene chloride is preferred.

As indicated the peracid compound is one derived from a lower aliphatic acid. Thus, peracetic acid and perpropionic acid may be used. Because of convenience, peracetic acid is preferred. It is also satisfactory and in some instances may be desirable to form the peracid compound in situ. Thus, by adding hydrogen peroxide together with acetic acid and acetic anhydride or propionic acid and propionic anhydride, generally equivalent results may be obtained. The stoichiometry of the reaction is such that one mole of peroxy compound is required for each mole of tetrahalomuconic acid formed, but the optimum reaction conditions plus the notorious instability of peroxy compounds dictate that at least about 1.5 moles of peroxy compound be used per mole of perhalo-o-quinone. A larger excess will give more satisfactory results but there is no particular advantage in using more than about 10 moles of peroxy compound per mole of perhalo-o-quinone. Optimum results will be obtained if from about 2.5 to about 5 moles of peroxy compound per mole of perhalo-o-quinone is used and it is preferred to use about 2.5 moles per mole. In the event hydrogen peroxide and an aliphatic acid or anhydride is used, an equivalent oxidative amount is required to provide the hereinbefore disclosed ratios.

The strong acid is selected from the group consisting of sulfuric acid, trichloroacetic acid, trifluoroacetic acid and pyrophosphoric acid. The function of the strong acid in the method of the invention is not clearly understood, but it apparently acts as an aid to the oxidation or as some form of what might be loosely termed a catalyst. In any event, the material is essential to acceptable yields of the tetrahalomuconic acids. The strong acid, as defined, is used in amounts between about 0.5 and 5.0 moles per mole of perhalo-o-quinone to be reacted. The optimum amounts may vary somewhat with the several strong acids but, generally, it is preferred to use between about 1.0 and 2.0 moles per mole. When sulfuric acid is selected as the strong acid, it is preferred that the concentrated form, 95% or more, be used. However, lesser concentrations, down to about 75%, may be used with satisfactory results.

The temperature at which the reaction can be satisfactorily carried out is between about 0° to 115° C.; below about 0° C. the reaction is so slow as to be not appreciably better than the known methods while at temperatures above about 115° C. the yields are reduced presumably because of the instability of the reactant perhalo-o-quinone and the tetrahalomuconic acid.

The following examples are illustrative of the present invention but are not to be construed as limiting:

*Example 1.—Peracetic Acid Method*

To a solution of 10 g. of ortho-chloroanil in 50 ml. of methylene chloride there was added 20 ml. of a 5M peracetic acid solution (in acetic acid) followed by 5 ml. of concentrated sulfuric acid. The mixture separates into two phases and was vigorously stirred to maintain a homogeneous mixture at room temperature. After about 65 hours the reaction mixture had become nearly colorless and a heavy white solid deposited. The reaction mixture was filtered, and the solid washed with methylene chloride. There was thus obtained 7.1 g. (62% yield) of tetrachloromuconic acid. The acid decomposed at its melting point with evolution of HCl to form the lactone. The resolidified sample melted at 160–163°. From the mother liquors there was obtained 1.0 g. additional material that was a mixture of tetrachloromuconic acid and the lactone.

*Example 2.—Hydrogen Peroxide Method*

The oxidation was conducted in a manner identical to the peracetic acid method, except that in place of the peracetic acid solution and sulfuric acid, the following reagents were added to the methylene chloride solution (10 g. in 50 ml.) of o-chloroanil, in the given order:

6 ml. of acetic acid
2.5 ml. of acetic anhydride
5 ml. of conc. $H_2SO_4$
5 ml. of 30% aqueous $H_2O_2$ solution The hydrogen peroxide addition was somewhat exothermic and must be conducted cautiously. The yield was 5.3 g. (46%).

I claim:

1. A process for preparing tetrahalomuconic acid comprising reacting perhalo-o-quinone with an alkanoic peracid having from 2 to 3 carbon atoms and a strong acid selected from the group consisting of sulfuric acid, trifluoroacetic acid, trichloroacetic acid and pyrophosphoric acid in a lower aliphatic chlorinated hydrocarbon solvent for the perhalo-o-quinone which is a non-solvent for the tetrahalomuconic acid.

2. The process of claim 1 wherein said solvent is present in an amount to provide a concentration of the quinone in the solvent of from about 5 to 30% by weight.

3. The process of claim 2 wherein said peracid is present in an amount of from about 1 to 10 moles per mole of quinone.

4. The process of claim 1 wherein said peracid is made in situ by adding to the reaction mixture hydrogen peroxide with a mixture selected from the group consisting of (1) acetic acid and acetic anhydride, and (2) propionic acid and propionic anhydride.

References Cited in the file of this patent

UNITED STATES PATENTS 2,534,212     Wacek _____ Dec. 19, 1950

OTHER REFERENCES

Boeseken: Rec. Trav. Chim-Pays-Bas, vol. 51, pages 964–970 (1932).
Boeseken: Rec. Trav. Chim-Pays-Bas, vol. 54, pages 345–352 (1935).
Linstead: J. Chem. Soc., 1950, page 2228.
Ppspisil: Chem. Abs., vol. 52, pages 14561–62 (1958).